Patented Dec. 5, 1944

2,364,091

UNITED STATES PATENT OFFICE 2,364,091

RECOVERING RESINS FROM COAL

Adriaan Nagelvoort, Salt Lake City, Utah

No Drawing. Application August 11, 1942,
Serial No. 454,463

2 Claims. (Cl. 209—6)

This invention relates to recovering resins from coal.

Hard copal resins of the kauri type exist in impure form in certain coals, notably in the upper seams of Utah bituminous coal. The resins are scattered throughout the coal in small lumps, streaks and lenticular masses, of various sizes. The lumps vary in color from light lemon yellow to deep red. Recovered in a pure condition these resins are useful in making oil varnish and for similar purposes. They are insoluble in many solvents, but, like the copals of commerce, they can be "run" and are afterwards soluble in drying oils, such as linseed oil.

In my copending application, Serial No. 368,737, filed December 5, 1940, for Recovering resins from coal of which this application is a continuation-in-part there is disclosed and claimed a method of recovering resins from coal, by a sink-and-float procedure, making use of the difference in true specific gravity between resins and coal; and of freeing the resins of asphalts and waxes by further sink-and-float steps. The product is useful in varnishes, and can be further purified, advantageously by the process of my application Serial No. 432,087, filed February 23, 1942, entitled Purifying resins, to yield a resin product comparable in every respect with the best grade fossil copals of commerce.

The present invention is concerned with improvements in recovering resins from coal, and especially in the initial stages of concentration. The object is to simplify and cheapen the preliminary rough concentration and at the same time to handle the raw coal in such manner that its lump size is reduced as little as possible, whereby the resin-freed coal is kept in a condition more commercially attractive than is powdered coal.

Treatment of resins by sink-and-float, solvent extraction and other purification methods requires that the resin be finely divided, so as to pass a 20-mesh screen for example. Hitherto the whole coal has been ground up to this size directly, prior to application of purification procedures. There are disadvantages in this, because of excessive grinding costs and because the resin-free coal is virtually in the form of powdered coal, which makes it a rather low-grade byproduct, despite the fact that it is a better coal than the raw coal by virtue of the elimination of the soot-forming resins.

The present invention is based on the discovery that by taking advantage of the physical form and size in which the resin occurs in the coal, it is possible to take out of the coal mechanically most of the resin, without breaking down the coal proper to an undesirable degree. More specifically, I find that by grinding the raw coal only to the extent that it passes say a one-inch-mesh screen, and then screening the mixture over a much smaller screen (say $\frac{1}{16}$-mesh) the screenings contain most of the resin content of the coal. Advantageously, after the grinding step and before screening the mixture is tumbled, in a long rotating tube, to cause the coal lumps to rub against each other and detach the resin inclusions.

The peculiar action described is believed attributable to the fact that the resin granules, flat lenses, streaks, etc. form surfaces of easy cleavage in the coal.

The fine fraction, which still contains adherent coal, can then be ground to treatment size, say minus 20 mesh, conveniently in a rod mill. The coarse coal lumps, much of which are coarser than $\frac{1}{16}$ inch, are a valuable byproduct. This resin-freed coal can be used in ordinary stokers, etc. and commands a higher price than raw coal of the same size, because it is virtually sootless.

In a specific example illustrative of one good mode of practicing the invention, 1000 pounds of Utah coal containing 50 pounds of non-coal resinous matter, i. e. impure resins associated with asphalts and waxes, were crushed in a conventional coal crusher so as to pass a one-inch screen. The crushed coal was now tumbled in a slightly inclined rotating cylinder, 3 feet long by 6 inches diameter. Some reduction of the resin particle size occurred but the coal proper was not broken down much. The tumbled coal was screened with a $\frac{1}{16}$ inch screen, through which passed about 80 per cent of the total resin, or about 40 pounds. The screenings were broken in a rod mill to minus 20 mesh size, and subjected to further treatment according to my acknowledged pending applications.

The resin-freed coal had a sieve analysis as follows:

| | Per cent |
|---|---|
| Above $\frac{1}{16}$ inch in size | 75 |
| Below $\frac{1}{16}$ inch in size | 25 |

It was characterized by freedom from soot in combustion.

From the foregoing it will be apparent that my invention provides a method of preliminary separation of resin from coal whereby the production of excessive coal fines is avoided and the treated coal is of desirable lump size, while at the same time the resin inclusions are substantially completely removed.

What I claim is:

1. In recovering resins from coal in which the resin exists as discrete inclusions, the method which comprises breaking down the coal to a lump size only small enough so that the resin inclusions are largely separated from the coal as granules of substantially smaller average size than the lumps of coal, tumbling the broken-down coal to cause the lumps to rub each other and dislodge the resin, mechanically separating a relatively small size fraction consisting mainly of resin granules and a relatively large size fraction consisting mainly of large coal lumps, and purifying the separated resin granules.

2. In recovering resins from a coal in which the resin exists as discrete inclusions, the method which comprises breaking down the coal to a size only such as to pass a one-inch-mesh screen whereby the resin inclusions are largely freed from the coal as granules of substantially smaller average size than the lumps of coal, sieving the mixture through approximately a $\frac{1}{16}$-inch-mesh screen to separate the smaller resin granules from the larger coal lumps, and purifying the separated resin granules.

ADRIAAN NAGELVOORT.